Patented Feb. 17, 1942

2,273,471

UNITED STATES PATENT OFFICE 2,273,471

DI (ARYLALKYL) SULPHIDE

Richard H. Kimball, Lewiston, N. Y., assignor to Hooker Electrochemical Company, Niagara Falls, N. Y., a corporation of New York No Drawing. Application January 17, 1941, Serial No. 374,915

10 Claims. (Cl. 260—608)

My invention relates to di-aryl alkayl sulphides and more particularly to di-aryl alkyl sulphides of high fluidity and low crystal point.

Di-aryl alkyl sulphides are produced by linking together two alkyl-benzene or aryl alkyl structures through their alkyl groups by one or more sulphur atoms. This is done by first substituting a halogen atom, preferably chlorine, for a hydrogen atom in the alkyl group and then replacing two chlorine atoms, one from each of a pair of the resulting molecules, by one or more sulphur atoms, thus linking the molecules together. For this purpose the sulphur is supplied in the form of a sulphide of an alkali metal, preferably sodium, the sodium assisting the reaction by combining with the displaced chlorine. Such compounds therefore ordinarily contain no chlorine. Moreover, they are generally chemical individuals and therefore crystalline solids at ordinary temperatures. Dibenzyl disulphide is useful as an antioxidant for mineral lubricating oils. It has only a limited solubility in such oils, but as the quantity required is small, when it is to serve as an antioxidant only its solubility is sufficient for that purpose. Dibenzyl disulphide also has the property of increasing the film strength or load carrying capacity of the oil, but for that purpose its solubility leaves something to be desired.

In Patent No. 2,185,009, there is disclosed a process for production of di-haloaryl alkyl sulphides, therein termed "di-halobenzenoid alkyl sulphides", which as the name implies, contain halogen in their benzene rings. These are produced by halogenating an alkylbenzenoid structure first in the benzene ring and then in the alkyl group in well known manner and then joining two of the resulting molecules by means of one or more sulphur atoms in the manner described. Since a halogen atom may enter the benzene ring in either the ortho or para position, such a product, if made from monochlor toluene, for example, is a mixture of three isomers, namely, ortho with ortho, para with para and ortho with para. On this account di-monochlorbenzyl polysulphide has a relatively low crystal point and is therefore quite soluble in mineral lubricating oils. It is very useful as an addition agent in such oils, both the sulphur and chlorine serving to increase the film strength or load carrying capacity of the oil. For some purposes, however, such as cutting oils and hypoid gear oils, a product having a still lower crystal point is desirable. I have succeeded in making such a product by carrying out an analogous reaction between a sulphide of sodium and mixtures of benzyl chlorides and chlorbenzyl chlorides, so as to produce a very diverse mixture of analogous products and their isomers. The sulphide may be the monosulphide or polysulphide. I will therefore designate it as Na$_2$S$x$.

The reactions are as follows:

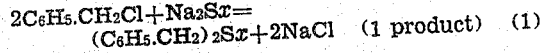

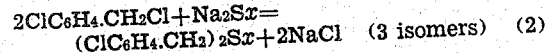

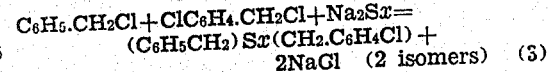

It will be noted that the products of Reactions 2 and 3 contain chlorine as well as sulphur, the chlorine being attached to the ring. The product of Reaction 1 is an individual, whereas the products of Reactions 2 and 3 are mixtures of three and two isomers respectively. If Reactions 1 and 2 were carried out separately and the products then mixed, the result would be a mixture of four products. By mixing the reagents before the reaction two additional isomers of Reaction 3 are secured. As will be shown later, the effect of this is to lower the crystal point materially.

The crystalline dibenzyl disulphide of the prior art referred to above is produced from benzyl chloride made by chlorinating toluene in the alkyl group and fractionating the product to eliminate any benzal chloride that may be produced simultaneously. The product, as stated, is therefore nearly a chemical individual. In my present process I may dispense with the fractionation step. Similarly, in the process of the patent referred to above in which the toluene is first chlorinated in the ring, it is necessary to distill the product to remove the iron catalyst required for this chlorination. In so doing it is customary to fractionate out and use only the monochlortoluene. This is then chlorinated to monochlorbenzyl chloride, which is again fractionated to exclude monochlorbenzal chloride. In my present process this second fractionation may likewise be dispensed with.

The proportion of benzyl to benzal chloride produced by chlorination of toluene is fairly definite and may be regulated by controlling the gravity to which the toluene is chlorinated. Thus if the gravity is 1.075 the proportions are 75 and 9.5 per cent respectively. If the gravity is 1.120 the proportions are 76 and 18 per cent respectively. The remainder in each case is unchlorinated toluene.

In my present process I may therefore not only save the cost of two fractionations, but I may react sodium polysulphide with a mixture of benzyl chloride and monochlorbenzyl chloride containing minor proportions of benzal chloride and monochlorbenzal chloride, thus producing a mixture of the products of Reactions 1, 2 and 3 which may possibly also contain analogous benzal products, produced in accordance with the following reactions:

$$2C_6H_5.CHCl_2 + Na_2Sx = (C_6H_5.CHCl)_2Sx + 2NaCl \quad \text{(1 product)} \quad (4)$$

$$2ClC_6H_4.CHCl_2 + Na_2Sx = (ClC_6H_4CHCl)_2Sx + 2NaCl \quad \text{(3 isomers)} \quad (5)$$

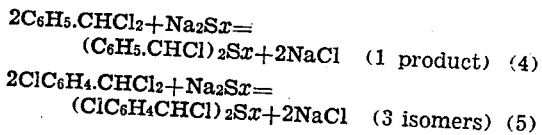

(2 isomers) (6)

All three of these products would contain chlorine in the alkyl group and the products of Reactions 5 and 6 would also contain chlorine in the ring. As in the case of the products of Reactions 1 to 3, Product 4 is an individual and Products 5 and 6 mixtures of three and two isomers respectively.

If the Products 1 to 3 and 4 to 6 were made by separate reactions and then mixed, the result would be a mixture of 12 products. However, it should be remembered that in my process the reagents are mixed before the reaction, therefore a number of cross combinations are possible. It can be shown that under these conditions 9 additional products are theoretically possible, so that the result of the reaction may be a mixture of 21 products.

Moreover, each of these products is susceptible of further variation in respect of the $x$ of the $Sx$. The value of $x$ may be 1, 2, 3 or even more. As a matter of fact, the reaction is carried on with sodium monosulphide in presence of an excess of sulphur and the value of $x$ depends upon the amount of this excess. Whatever the excess, if the average number of sulphur atoms is fractional, all the molecules cannot possibly have the same number of sulphur atoms. I therefore prefer to use a fractional value of $x$. In any case, the expression "polysulphide" should be understood as indicating a mixture in which some of the molecules have more than one sulphur atom but others may have only one sulphur atom.

It would of course be possible to increase the diversity of products in the mixture still further by chlorinating a part of the toluene to dichlortoluene or higher or by mixing xylene with the toluene; but until now this has not been found necessary. It will therefore be seen that by my process I obtain a very diverse mixture of reaction products of sodium polysulphide with alkylbenzene chlorination products. The relative proportions of the various products may be controlled by varying the ratio of the reagents. In practice I prefer to react with the sodium polysulphide a mixture that is substantially equimolecular with respect to benzyl and monochlorbenzyl chloride and likewise with respect to benzyl and benzal or monochlorbenzyl and monochlorbenzal chloride.

The following table shows the leading characteristics of a number of products made in accordance with my invention from different starting mixtures, also, for comparison, of two products of the prior art.

Reagents

| Ex. No. | $C_6H_5CH_3$ wt. percent | $C_6H_5CH_2Cl$ wt. percent | $C_6H_5CHCl_2$ wt. percent | $ClC_6H_4CH_3$ wt. percent | $ClC_6H_4CH_2Cl$ wt. percent | $ClC_6H_4CHCl_2$ wt. percent | Value of $x$ in $Na_2Sx$ |
|---|---|---|---|---|---|---|---|
| 1 | None | 100 | None | None | None | None | 2 |
| 2 | 40 | 56 | 4 | None | None | None | 2 |
| 3 | 6 | 76 | 18 | None | None | None | 2 |
| 4 | None | None | None | None | 100 | None | 2 |
| 5 | None | None | None | 34 | 60 | None | 2 |
| 6 | None | [1] 44 | None | None | [1] 56 | 6 | 2 |
| 7 | None | 70 | None | None | 30 | None | 2 |
| 8 | None | 20 | None | None | 80 | None | 2 |
| 9 | None | [1] 44 | None | None | [1] 56 | None | 2 |
| 10 | 7.5 | 32.5 | 4.0 | 19.0 | 33.6 | 3.4 | 2 |
| 11 | 6.0 | 76.0 | 18.0 | None | None | None | 2 |
| 12 | None | None | None | 34.0 | 60.0 | 6.0 | 2 |
| 13 | None | 70 | None | None | 30 | None | 5 |
| 14 | 7.5 | 32.5 | 4.0 | 19.0 | 33.6 | 3.4 | 2.55 |
| | | | | | | | 3.5 |

Products

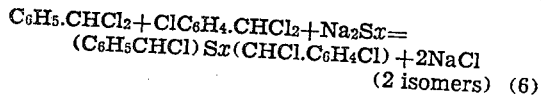

| Ex. No. | S wt. percent | Hydrolyzable chlorine wt. percent | Total chlorine wt. percent | Melting point Degrees | Last crystal point °C. | Physical state at ordinary temperatures |
|---|---|---|---|---|---|---|
| 1 | 25.4 | 0.14 | 0.27 | 65.3 | 67.1 | Solid. |
| 2 | 24.9 | 1.2 | 1.4 | 62.8 | 65.1 | Do. |
| 3 | 26.0 | 2.1 | 2.6 | 53.1 | 59.6 | Do. |
| 4 | 19.3 | 0.51 | 22.7 | Indef. | 46.3 | 75% crystals. |
| 5 | 18.2 | 1.4 | 22.4 | Indef. | 38.7 | 50% crystals. |
| 6 | 22.0 | 0.35 | 11.5 | 44.0 | 47.7 | Solid. |
| 7 | 23.8 | 0.32 | 6.9 | Indef. | 48.0 | 90% crystals. |
| 8 | 20.75 | 0.38 | 18.1 | Indef. | 40.2 | 5% crystals. |
| 9 | 23.0 | 0.32 | 12.7 | Indef. | 27.9 | Liquid. |
| 10 | 20.0 | 2.8 | 15.7 | Indef. | 22.0 | Do. |
| 11 | 43.7 | 2.8 | | Indef. | (³) | Do. |
| 12 | 22.7 | 1.1 | 22.0 | Indef. | 36.3 | 5% crystals. |
| 13 | 29.6 | 2.8 | 8.4 | Indef. | 39.8 | Liquid. |
| 14 | 29.2 | 3.9 | 14.3 | Indef. | (³) | Do. |

[1] Equimolecular.
[2] Reagents reacted separately and products afterwards combined.
[3] Refuses to crystallize, though seeded, at −10° C.

It should be understood that the toluene and monochlortoluene shown in the first table as present in the reagents are not found in the products, as these raw materials are relatively volatile and are distilled off after the reaction.

By "hydrolyzable chlorine" is meant chlorine that can be removed by treatment with an alcohol solution of KOH. This is mostly chlorine in the alkyl group, introduced with the benzal chloride constituents, which may be present in traces even after distillation.

The term "last crystal point" used in the tables refers to the temperature at which the last crystals disappear, after the product has been chilled and caused to crystallize as fully as possible, by seeding if necessary. The last crystal point is not the temperature at which crystallization will spontaneously commence when the product is cooled. This temperature, which may be termed the "first crystal point," is much lower. Thus, the products of examples 9 and 10 are completely liquid at ordinary winter temperature, and that of example 8 nearly so.

It will be noted that example 1 is that of the prior art in which the product is solid at ordinary temperatures. Example 2 corresponds to example 1 in that the reagents are the same, except that the benzyl chloride has not been distilled to eliminate benzal chloride as far as possible. It will be seen that last crystal point of the product has thereby been reduced from 67.1 to 65.1° C. Example 3 corresponds to example 2, except that the ratio of benzal to benzyl chloride has been increased and the last crystal point has thereby been lowered from 65.1 to 59.6° C.

Example 4 is that of Patent 2,185,009. Example 5 corresponds to example 4, except that, as in examples 2 and 3, the chlorbenzyl chloride has not been distilled to eliminate chlorbenzal chloride. It will be seen that the effect of leaving in the chlorbenzal chloride is to reduce the percentage of crystals at ordinary temperature from 75 per cent to 50 per cent.

Example 6 is given to show the effect of mixing equimolecular quantities of the products of examples 1 and 4, thus producing a mixture of four products. As might be expected, the last crystal point is considerably below the mean for examples 1 and 4; but not so much below as if the reagents had been mixed before the reaction, as will be seen in connection with the examples which follow.

Examples 7, 8 and 9 show the effect of mixing the benzyl chloride with the chlorbenzyl chloride before the reaction, so as to produce a mixture of six products. In example 7 the benzyl chloride is in major proportion and in example 8 in minor proportion. In example 9 the proportions are equimolecular. A comparison of the last crystal points of the products of these three examples show that the full benefit of mixing the reagents before the reaction is not realized unless the proportions are such as to yield the greatest diversity of products theoretically possible, and in approximately equimolecular quantities. A comparison of example 9 with example 6 also shows very strikingly the importance of mixing the reagents, in optimum proportions, before the reaction rather than reacting them separately and mixing the products, since this results in a lowering of the last crystal point from 47.7° to 27.9° C.

In example 10 the benzyl chloride and chlorbenzyl chloride are used in approximately equimolecular proportions, both undistilled. The resulting product has a last crystal point of 22° C. As explained above, this does not mean that it solidifies, or even starts to do so, at 22° C. As a matter of fact, unless seeded, this product may be cooled to −40° C. without showing any signs of crystallizing. The only effect of such cooling is an increase in viscosity. Below −40° C., the product is a clear amber super-cooled liquid, too viscous to flow appreciably in 5 seconds in a one inch test tube. This temperature is therefore its pour point.

Examples 11 and 12 are given in order to show the effect of increasing the sulphur content by adding more sulphur to the polysulphide and thus increasing the value of $x$ in the Na$_2$S$x$.

In Example 11 the polysulphide is Na$_2$S$_5$ and this is reacted with an undistilled benzyl chloride mixture having the same composition as in Example 3. It will be seen that the resulting product has the very high sulphur content of 43.7 per cent. The chlorine is of course low and is nearly all hydrolyzable. The physical state is that of a liquid at ordinary temperatures. The melting point is indefinite and the last crystal point so low as to be indeterminate without great difficulty. Comparing this product with that of Example 3, it will be seen that the effect of increasing the sulphur content from 26 to 43.7 per cent has been to transform the product from a solid at ordinary temperature to an extremely low solidifying liquid.

In Example 12, the polysulphide is Na$_2$S$_{2.55}$ and this is reacted with the undistilled chlorbenzyl chloride mixture of Example 5. When the product of this example is compared with that of Example 5, it will be seen that the relatively small increase in sulphur of from 18.0 per cent to 22.7 per cent, has changed the product from a liquid containing 50 per cent crystals to one containing only 5 per cent crystals at ordinary temperatures, although the effect on the last crystal point is not very great. This difference in the physical state of the products can hardly be accounted for by the increase in sulphur alone. It must be assumed that this difference is largely attributable to diversification of the product, due to the fact that, since the average number of sulphur atoms per molecule is fractional, some must contain two and others three.

In example 13 the polysulphide is Na$_2$S$_3$ and this is reacted with the same mixture of reagents as in example 7. The sulphur content of the product is thereby increased from 23.8 to 29.2 per cent. While this increase does not reduce the last crystal point very greatly the effect on the physical state of the product is nevertheless very marked, as it is changed from a 90 per cent crystalline product to a liquid.

In example 14 the polysulphide is Na$_2$S$_{3.5}$ and the other reagents the same as in example 10. In this case the sulphur content is increased from 20.0 to 29.2 per cent. While this is not a very great increase, the effect upon the physical state of the product is again rather remarkable, inasmuch as it could not be induced to crystallize by rubbing, seeding, etc., at temperatures as low as −10° C. This is also true of the product of example 11. A comparison of these two products is interesting, as it shows that high fluidity or resistance to crystallization can be secured either by high sulphur content or by great diversification of the product.

It will also be noted that the sulphur content of the product is not always in proportion to that of the polysulphide. This may be because the reaction seems to show a preference for formation of the disulphide.

Lubricants for use in automobile lubrication must pass the following test: To a body of 150 vis. Penn neutral oil enough of the product is added to bring the sulphur content of the oil up to 0.60%. A bright copper rod is then immersed for about half its length in this oil, while maintaining the oil at 212° F., for one hour. Under these conditions little or no discoloration of the copper should take place. However, when immersed for one hour at 300° F. the copper should definitely blacken. All the products of the foregoing examples 1 to 10 inclusive are satisfactory with respect to this sulphur test for automobile lubricants. The products of examples 11, 13 and 14 contain more active sulfur, and are better suited to use in cutting oils.

The products made in accordance with my process, as illustrated in examples 2, 3 and 5 to 10, therefore contain 18.2 to 26.0 per cent sulphur and 1.2 to 22.4 per cent chlorine. They have last crystal points of 65.1 to 22.0° C. The products of example 11 has the sulphur content of 43.7 per cent. The products of examples 9, 10, 11 and 13 are liquid at ordinary temperatures and unless seeded will remain so at very low temperatures. The product of examples 11 and 14 have hitherto resisted all attempts to induce crystallization. The products of examples 9, 10, 11, 13 and 14 are particularly well adapted to be sold as they are and added to the oil by the refiner, as they will reach the latter in a wholly fluid state under any ordinary conditions. These liquid products, of course, blend with mineral lubricant oils more readily than the solid or semi-solid products of the prior art.

Although I have used only derivatives of toluene illustrative of my process and products it is to be understood that my process is equally applicable to derivatives of xylene, alkyl-naphthalene, alkyl-anthracene etc. In the case of compounds having more than one alkyl group, the two alkyl benzenoid molecules may be linked through more than one alkyl group. Also, the alkyl group may be a methyl, ethyl or other alkyl group. Any compound of the class described produced by reacting with a sulphide of an alkali metal a mixture of halogenated alkyl benzenoid compounds having unequal numbers of halogen atoms in their rings or alkyl groups comes within the scope of my invention.

In the carrying out of my process any convenient method of performing the reaction may be employed. It has heretofore been generally customary to react benzyl chloride with an aqueous solution of sodium polysulphide in a mutual solvent for these two reagents, such as alcohol. In the process of the patent referred to as well as of Patents Nos. 2,185,007 and 2,185,008 the mutual solvent is dispensed with, it having been found that the yield is improved and cost reduced if mechanical agitation is used instead. In my present process I prefer to dispense with the mutual solvent, but do not wish to be limited to doing so as my process can be carried out with or without the use of such a solvent.

I claim as my invention:

1. As new compositions of matter blending readily with mineral lubricating oils and useful as film strengthening agents therein, the products obtained by reacting with a sulphide of an alkali metal a mixture of benzyl chloride and chlorbenzyl chloride in proportions to yield, after separation from any unreacted reagents and the by-product alkali metal chloride, reaction products normally largely liquid at ordinary temperatures and having last crystal points not substantially above 40.2° C.

2. As new compositions of matter blending readily with mineral lubricating oils and useful as film strengthening agents therein, the products obtained by reacting with an alkali metal polysulphide a mixture of benzyl chloride and chlorbenzyl chloride in proportion to yield, after separation from any unreacted reagents and the by-product alkali metal chloride, reaction products normally largely liquid at ordinary temperatures and having last crystal points not substantially above 40.2° C.

3. As new compositions of matter blending readily with mineral lubricating oils and useful as film strengthening agents therein, the products obtained by reacting with a sulphide of an alkali metal a mixture of benzyl chloride and monochlorbenzyl chloride in proportions to yield, after separation from any unreacted reagents and the by-product alkali metal chloride, reaction products normally largely liquid at ordinary temperatures and having last crystal points not substantially above 40.2° C.

4. As new compositions of matter blending readily with mineral lubricating oils and useful as film strengthening agents therein, the reaction products obtained by chlorinating toluene and chlortoluene in their methyl groups and reacting with a sulphide of an alkali metal a mixture of the resulting chlorination products, in proportions to yield, after separation from any unreacted reagents and the by-product alkali metal chloride, reaction products normally largely liquid at ordinary temperatures and having last crystal points not substantially above 40.2° C.

5. As new compositions of matter blending readily with mineral lubricating oils and useful as film strengthening agents therein, the reaction products obtained by separately chlorinating toluene and chlortoluene in their methyl groups and reacting with a sulphide of an alkali metal a mixture of the resulting chlorination products, in proportions to yield, after separation from any unreacted reagents and the by-product alkali metal chloride, reaction products normally largely liquid at ordinary temperatures and having last crystal points not substantially above 40.2° C.

6. As new compositions of matter blending readily with mineral lubricating oils and useful as film strengthening agents therein, the reaction products obtained by chlorinating toluene and chlortoluene in their methyl groups until containing minor proportions of benzal and chlorbenzal chloride respectively and reacting with a sulphide of an alkali metal a mixture of the resulting chlorination products, in proportions to yield, after separation from any unreacted reagents and the by-product alkali metal chloride, reaction products normally largely liquid at ordinary temperatures and having last crystal points not substantially above 40.2° C.

7. As new compositions of matter blending readily with mineral lubricating oils and useful as film strengthening agents therein, the products obtained by reacting with a sulphide of an alkali metal having an average of not less than substantially 3 sulphur atoms per molecule a mixture of benzyl chloride and chlorbenzyl chloride, in proportions to yield, after separation from any unreacted reagents and the by-product alkali metal chloride, reaction products normally largely liquid at ordinary temperatures and having last crystal points not materially above 39.8° C.

8. As a new composition of matter blending readily with mineral lubricating oils and useful as a film strengthening agent therein, the product obtained by reacting with a sulphide of an alkali metal corresponding substantially to the disulphide a mixture of benzyl chloride and monchlorbenzyl chloride in substantially equimolecular proportions, to yield, after separation from any unreacted reagents and the by-product alkali metal chloride, a reaction product normally liquid at ordinary temperatures and having a last crystal point not materially above 27.9° C.

9. As a new composition of matter blending readily with mineral lubricating oils and useful as film strengthening agents therein, the reaction product obtained by chlorinating toluene and monochlortoluene in their methyl groups until containing minor proportions of benzal and chlorbenzal chloride respectively and reacting with a sulphide of an alkali metal corresponding substantially to the disulphide a substantially equimolecular mixture of the resulting chlorination products, to yield, after separation from any unreacted reagents and the by-product alkali metal chloride, a reaction product normally completely liquid at ordinary temperatures and having a last crystal point not materially above 22° C.

10. As new compositions of matter blending readily with mineral lubricating oils and useful as film strengthening agents therein, the reaction products obtained by chlorinating toluene and chlortoluene in their methyl groups and reacting with a sulphide of an alkali metal having an average of not less than substantially 3½ sulphur atoms per molecule a mixture of the resulting chlorination products, in proportions to yield, after separation from any unreacted reagents and the by-product alkali metal chloride, reaction products containing more than 25 per cent sulphur and uncrystallizable at −10° C.

RICHARD H. KIMBALL.